United States Patent Office 3,242,105
Patented Mar. 22, 1966

3,242,105
QUATERNARY AMMONIUM-TIN HALIDE POLYMERS
Richard Waack, Framingham, Mass., assignor to The Dow Chemical Company, Midland, Mich., a corporation of Delaware
No Drawing. Filed June 13, 1962, Ser. No. 202,049
8 Claims. (Cl. 260—2)

This invention relates to the preparation of certain polymeric materials having a characteristic chain including metal atoms and quaternary nitrogen atoms as a repeating unit in the polymer chain.

Where it is desirable to have specialized polymer compositions, it is sometimes possible to create those compositions with appropriate monomer units. For many purposes an amino metallic chain polymer structure also containing moieties suitable for cross linkage is desirable and it is accordingly an object of this invention to provide a method of preparing novel polymers characterized by the linear amino chain structure having in it nitrogen atoms and metal atoms in such arrangement that substantial variations of detailed physical properties can be achieved while yet maintaining characteristic reactability and reaction sites of the polymer.

Other objects and advantages of the invention will in part be obvious and in part appear hereinafter.

The invention, accordingly, is embodied in polymers carrying a metal and quaternary nitrogen atom as the basic repeating unit in the polymer backbone, the backbone of the polymer being more generally illustrated as follows:

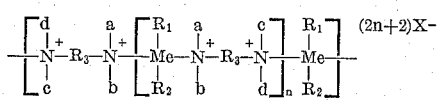

wherein X represents halogen, i.e., chlorine, bromine, iodine, fluorine; $R_1$ and $R_2$ represent organic groups such as phenyl, methyl, ethyl, propyl, butyl, pentyl, and similar relatively lower alkyl and vinyl groups; where $R_1$ and $R_2$ are vinyl the compound is capable of entering additional moieties through the unsaturated group; $a$, $b$, $c$ and $d$ represent hydrogen, lower alkyl and lower alkanoic acid groups; $R_3$ represents alkylene and cycloalkylene moieties, such as dimethylene, trimethylene, tetramethylene, hexamethylene, cyclohexylmethylene and other cyclic alkylene groups between nitrogen atoms, and aromatic amines such as bipyridines, as well as the carbon portion of the dinitrogen ring, the function of this $R_3$ group being simply that of a spacer between nitrogens; and $n$ being the indicated degree of polymerization and having a range of valves from 1 to 1000.

It will be apparent that, if metal halides or amines having a reactive functionality greater than 2 are used, sites on the fundamental polymerizing moiety occur suitable for reaction to induce cross-linked polymers. Typical reactive materials are, organo tin halides, organo lead halides and other metals; also organic groups which will give two active halogen atoms such as the di(bromomethyl) benzene.

The invention, accordingly, is based on the synthesis of this novel polymeric structure which optionally can be linear, or cross-linked, and combinations of both, as well as virtually any molecular weight, as determined by the portions of reactants to be used and can be a quaternary ammonium metal halide polymer involving virtually any metal which forms a sufficiently active organo halide to be useful for reaction to the process.

The general reaction by means of which polymers are formed in accordance with this invention is illustrated schematically in the following, where ethylene diamine is used as the typical amine and a tin di-halide is used as the typical metal halide. In this case the reaction is as follows:

$$H_2NCH_2CH_2NH_2 + (Ph)_2SnCl_2$$

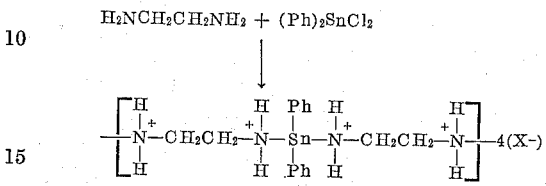

With $a$, $b$, $c$, $d$ of the general representation being —$CH_2COOH$, when using divinyl tin dichloride, the product is

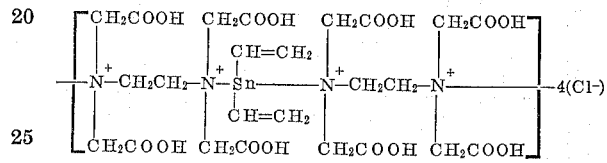

In the preparation of compounds in accordance with this scheme I found that under the conditions in which it is convenient to work that the molecular weight can be easily made to go to 1000 and, generally, molecular weights as high as 50,000 are reached. Actually the highest molecular weight in a given set of circumstances will be determined by the reactant present in excess amount. That is, after a period of time, it will stop off the ends of the chain at a molecular weight representing complete consumption of the reactant present in least amount.

The reaction employing a tri-functional amine and tin dihalide will give a cross-linked polymer in substantially the following scheme, employing diethylene triamine and diphenyl tin dibromide:

$$H_2NCH_2CH_2N(H)CH_2CH_2NH_2 + (Ph)_2SnBr_2$$

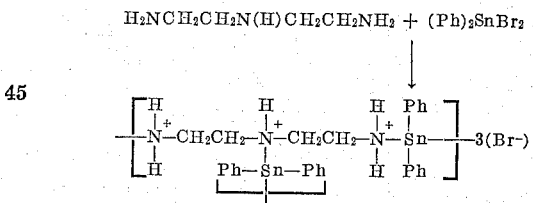

The process of making these polymers and the structure of the polymers can be better understood by reference to the following specific examples.

Example I

One system prepared was the 1 to 1 polymer of 2,2′-bipyridine and diphenyl tin dichloride. To form the polymer, a solution of diphenyl tin dichloride (0.32 molar in ethanol) was slowly added to an equal molar amount of an ethanol solution of 2,2′-bipyridine (0.16 molar). The polymer, which is insoluble in ethanol, begins precipitating almost immediately. The reaction was stirred for 2 hours. By filtration and washing with ethanol, an 86% yield of the 1—1 polymer (as shown by elemental analysis) was isolated. The polymer was insoluble in most common organic solvents, water and weak acid and base. On fusion (melting range 195° C.) it formed a clear, slightly yellow film. The polymer does not support combustion in the absence of a flame. The reaction carried out in accordance with this example may be illustrated as follows:

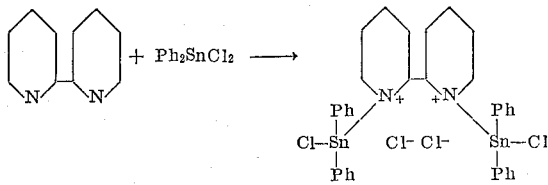

The estimated molecular weight for the polymer prepared was ~5000.

*Example II*

This preparation was similar to that of Example I, except that benzene was used as the polymerization solvent. The reactants were added in the same order. Polymer did not precipitate for several minutes. The indication is that benzene is a better solvent for the lower molecular weight species, so the polymer did not precipitate until it has reached a higher degree of polymerization. The reaction time was 2 hours. An 80% yield of the 1—1 polymer was isolated. The polymer melting range was 205–210° C. higher than that of the Example I. It is indicated that the character of the polymer formed is somewhat sensitive to the reaction medium. The estimated molecular weight for the polymer prepared was 10,000.

Further reactions are carried out using virtually any type of difunctional amine which is capable of forming a stable salt, typical ones useful for carrying out the process are 4,4' dipyridine, ethylenediamine, tetrazine and ditetrazine, etc. In place of the organo tin compounds used in Examples I and II the moiety can be generalized so that any compound having a structure $R_1R_2MeX_2$ is useful, wherein the R represents an alkyl, aryl, vinyl or other organo group which would be dependent from the chain. Inasmuch as the $R_1$ and $R_2$ groups are dependent they do not interfere with the reaction and the only limitation on the nature of the $R_1$ and $R_2$ groups is that they be inert under reaction conditions thus virtually any alkyl, aryl or other organo groups are suitable. X in this formulation is any halogen and Me is a metal such as tin, lead, germanium.

The di-halo organo compound which can be used in place of the metal can be any in which the halogens are active, such for example, as a di-acid chloride, a di(halo methyl) benzene, a di-aryl chloride, etc.

*Example III*

Following the procedure of Example II divinyl tin dichloride is reacted with ethylene diamine, using benzene as the solvent. The polymer formed corresponds to the following:

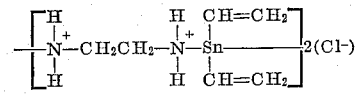

Molecular weight reaches 10,000 with ease.

*Example IV*

Following the procedure of Example II diethyl tin dichloride is reacted with ethylene diamine diacetic acid, using ethanol as a solvent. The polymer formed corresponds to the following:

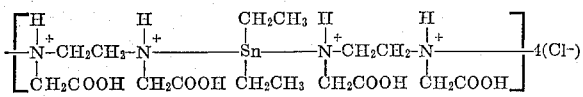

Because of limited solubility of the ethylene diamine diacetic acid in ethanol the polymer formed is of low molecular weight, i.e., about 500.

*Example V*

Following the procedure of Example II diethyl ethylene diamine is reacted with divinyl tin dichloride using toluene as a solvent. The polymer formed corresponds to the following:

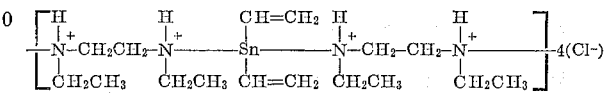

Molecular weight of 2500 is reached easily.

*Example VI*

Following the same procedure as in Example II, diethyl ethylene diamine diacetic acid is reacted with diphenyl tin dichloride in ethanol as a solvent. The polymer formed corresponds to the following:

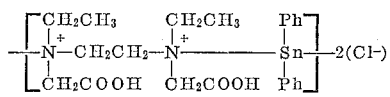

The conditions of the reaction, namely, pressure and temperature are relatively mild. Inasmuch as significant changes of volume are not involved, that is the reaction is liquid—solid or between liquids, pressure is not a significant variable. Temperature and time are all that need be controlled and generally ambient temperature on the order of ordinary room temperature, 20–30° C., is ample. With reasonably reactive materials time is not an important problem and reaction time may be virtually instantaneous to a reaction that will run several hours. The usual or conventional temperature-time relationships on the reaction occur and as in polymerization chemistry generally a relatively slow, controlled reaction running over a fairly long period of time is preferred.

The proportions of reactants are preferably in direct stoichiometric ratio, that is mol for mol. However, since perfection in this degree is never attained, one or the other will be in excess. To the extent it is desired to vary the nature of the chain one or the other of the reactants can be present in substantial excess thereby to stop ends of the chain.

The solvents useful for the process are any solvent which is adequate to bring materials into solution. Alcohols such as ethanol, propanol, butanol are suitable. Acetone, methylethyl ketone and other similar related simple solvent ketones are of value. Hydrocarbons, such as benzene, in some cases are useful in providing a reaction medium. The preferred reaction medium is the solvent which will take up the monomers but precipitate the polymers are shown in the specific Examples I and II. In this way it is possible for the operator to judge the extent or course of the reaction by the nature and the amount of the precipitated polymer obtained.

Precise physical properties of the polymer will, of course, depend upon the precise composition and nature of the substituent groups used.

In general the reaction proceeds directly on practically a quantitative basis and complete reaction is obtained in a relatively short time.

Of the various polymers which have been prepared in accordance with this invention it has been found that they are usually insoluble in water and the common organic solvents. Also they are insoluble in weak aqueous hydrogen chloride and potassium hydroxide solutions. The products of Examples IV and VI show some water solubility. The polymers can be fused to form hard, yellow brittle films which have a beginning melting point in the range from about 195–210° C. and decompose around 220° C. The material does not support combustion and is self-extinguishing. It is in this latter respect where a rather unique usefulness of the material shows up because it is useful for forming protective coatings and films, particularly in situations where fireproof paint coatings or films are desired.

By the incorporation of the metals into the composition, the properties of those metals are incorporated into transparent plastic films. Thus by introducing lead into the molecule using lead halides, where tin halides have been exemplified, the polymer will be a transparent one useful as a radiation shield window. The use of the vinyl substituted tin compounds, such as divinyl tin chloride will give additional reactant sites for cross-linking. Also where the reaction is so explored, it is possible to prepare polymers with pendant amine or pyridine groups to give cross-linking by the addition of organo tin dihalide at those points.

What is claimed is:

1. The method of forming a polymer characterized by the presence of tin in its linear backbone structure which comprises reacting an organotin halide, having the formula $R_1R_2SnX_2$ with a diamine, having two amino groups spaced from each other, thereby to produce a quaternary polymer having a structure corresponding to the following:

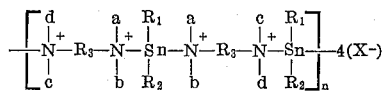

wherein X represents halogen, $R_1$ and $R_2$ are independently selected from the group consisting of phenyl, loweralkyl, and vinyl, and $R_3$ is selected from the group consisting of alkylene and cyclo alkylene spacer moieties between nitrogen atoms, and $a$, $b$, $c$ and $d$ represent moieties selected from the group consisting of hydrogen, loweralkyl and loweralkanoic acid groups, and $n$ is an integer having a value in the range 1–1000.

2. The method in accordance with claim 1 in which an alkylene diamine and divinyltin dichloride are reacted to form a quaternary polymer.

3. Method of forming a polymer characterized by the presence of tin in its linear backbone structure which comprises reacting diphenyltin dichloride with 2,2′-bipyridine, to produce a quaternary polymer.

4. Method of forming a polymer characterized by the presence of tin in its linear backbone structure which comprises reacting divinyltin dichloride with 2,2′-bipyridine, to produce a quaternary polymer.

5. A quaternary ammonium polymer corresponding to the following:

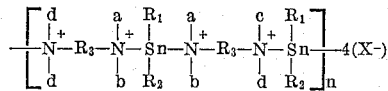

wherein
X represents halogen;

$R_1$ and $R_2$ are independently selected from the group consisting of phenyl, lower alkyl, and vinyl of an organo tin compound $R_1R_2SnX_2$;

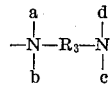

represent any diamine wherein the $a$, $b$, $c$ and $d$ substituents on the nitrogens are selected from the group consisting of hydrogen, lower alkyl and lower alkanoic acid moieties; $R_3$ represents alkylene and cycloalkylene spacer moieties; and $n$ represents the degree of polymerization and has a range of values from 1 to 500.

6. A quaternary polymer of 2,2′-bipyridine and diphenyl tin dichloride.

7. A quaternary polymer of 2,2′-bipyridine and diethyl tin dichloride.

8. A quaternary polymer of ethylene diamine and divinyl tin dichloride.

References Cited by the Examiner

UNITED STATES PATENTS

| | | | |
|---|---|---|---|
| 2,259,063 | 10/1941 | Davis | 260—2 |
| 2,580,473 | 1/1952 | Sowa et al. | 260—429.7 |
| 2,807,910 | 10/1957 | Erickson | 250—567.6 |
| 2,867,566 | 1/1959 | Weinberg | 260—429.7 |
| 3,070,615 | 12/1962 | Seyferth | 260—429.7 |

MURRAY TILLMAN, *Primary Examiner.*

JOSEPH R. LIBERMAN, SAMUEL H. BLECH,
*Examiners.*